United States Patent Office 3,489,567
Patented Jan. 13, 1970

3,489,567
LUBRICATING COMPOSITIONS AND PHOTO-
GRAPHIC ELEMENTS HAVING LUBRI-
CATED SURFACE
Carl W. McGraw, Rochester, N.Y., assignor to Eastman
Kodak Company, Rochester, N.Y., a corporation of
New Jersey
No Drawing. Filed Mar. 3, 1967, Ser. No. 620,220
Int. Cl. G03c 1/86, 1/78
U.S. Cl. 96—85          13 Claims

ABSTRACT OF THE DISCLOSURE

Lubricating compositions and photographic elements having a lubricated surface containing a silicone compound and a β-alanine derivative surfactant.

BACKGROUND OF THE INVENTION

Field of the invention

This invention relates to photographic materials, their preparation and use. In one aspect, the invention relates to photographic elements having good slippage properties and good photographic properties. In another aspect, the invention relates to a lubricating composition which, when applied to the surface of a photographic element, reduces surface friction of the element without impairing its photographic properties. More particularly, the invention relates to photographic films, such as motion picture films, having a lubricated surface which allows the film to move freely through film magazines, camera gates, particularly motion picture camera gates, motion picture projector gates, printing apparatus and the like without jamming.

Description of the prior art

There are many ways which are known to reduce the sliding friction of films. Reduction of friction can be achieved by applying a lubricant to the processed and dried film before projection. To reduce the sliding friction of camera negative films, a suitable wax, e.g., carnauba wax or paraffin, can be added as a fine dispersion or solution to the photographic emulsion before it is coated on its support. Such additions, however, may have adverse effects on the physical or photographic properties of the photographic film or in its development characteristics.

U.S. Patent 3,042,522 issued July 3, 1962 to Ben-Ezra and Du Pont British Patent 955,061 published on Apr. 15, 1964, disclose lubricating compositions for photographic film which include a silicone polymer and certain surfactants. While these lubricating compositions provide some improvement, they still do not completely eliminate jamming of photographic film in a projector or camera.

SUMMARY OF THE INVENTION

According to my invention, I have found that when a mixture of a silicone lubricant and an amphoteric β-alanine derivative surfactant are applied to a photographic element, the mixture imparts superior slippage properties to the element and does not impair the photographic properties thereof. Moreover, the mixture does not have the disadvantages which result when the compounds are used individually for this purpose. Thus, the use of a water-dispersible silicone emulsion alone, while it imparts good slippage properties to a photographic film, has poor coating qualities and imparts a severe repellency to the film which interferes with the coating and developing processor, whereas the β-alanine derivative surfactants, while possessing good coating properties, are not very effective slippage agents when used alone. However, when a silicone emulsion and an amphoteric β-alanine derivative surfactant are mixed together, a synergistic effect is obtained and the mixture has good coating properties and imparts excellent slippage properties to the film without impairing the photographic properties thereof.

DESCRIPTION OF THE PREFERRED EMBODIMENTS

Any silicone compound can be used in the invention as long as it performs its intended lubricating purpose and has no adverse effect on the photographic properties of the film to which it is applied. Suitable silicone compounds are polymeric silicone compounds having the formula:

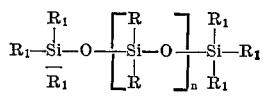

wherein R is an alkyl radical of 1 to 3 carbon atoms and $R_1$ is an alkyl radical of 1 to 3 carbon atoms or an alkoxy radical of 1 to 2 carbon atoms and $n$ is any number from 0 to 2000.

Useful silicone polymers include commercially available silicone oils such as the trialkyl and trialkoxy endblocked dialkylpolysiloxanes, e.g., dimethylpolysiloxane, diethylpolysiloxane, trimethoxy endblocked dimethylpolysiloxane and triethoxy endblocked dimethylpolysiloxane. These silicone compounds have molecular weights of 162 to 150,000, preferably 10,000 to 20,000, and a viscosity at 25° C. of from 2 centistockes to 100,000 centistokes, preferably 200 to 800 centistockes. Other silicone lubricants can also be used as if they have no adverse effects on the properties of the light-sensitive materials.

Mixtures of an alkyl silicone, such as methyl silicone, and an aryl silicone, such as phenyl silicone, are also quite useful. In such a mixture, the alkyl silicone can be present in a solution in a concentration of from about 0.5 to about 10% by weight and the aryl silicone can be present in a concentration of from about 0.5 to about 10% by weight. Any known solvent or solvent mixture may be used in preparing such a solution of a mixture of silicones. For example, 70% acetone and 30% methanol was found to be quite satisfactory.

A convenient method for preparing the lubricating composition of the invention is by adding the surfactant and a water-dispersible silicone emulsion to a water-permeable colloid such as gelatin, colloidal albumin, a polyvinyl compound, a cellulose derivative, an acrylamide polymer, etc. Such water dispersible silicone emulsions are sold by the Dow Corning Corporation under the trade names DC-35 and DC-36. These emulsions are water-dispersible liquids containing about 35% silicone. They contain as their active ingredients, dialkyl silicones such as dimethyl silicone, diethyl silicone, etc.; and diaryl silicones such as diphenyl silicone. The preparation and properties of such silicones are well known and described for instance, in Reuben Gutoff's article entitled "Silicone Fluid Manufacture," published in Industrial and Engineering Chemistry, vol. 49, pages 1807–1811. An aqueous dispersion containing 35% by weight of the silicone polymer is preferred, but dispersons containing 1 to 50%, by weight, of the polymer are also suitable.

The silicone polymer can be used in any concentration which is effective for the intended purpose. A suitable concentration is from about 0.5 to about 10%, preferably about 4% to about 8%, by weight based on the total vehicle solids content of the layer in which the polymeric silicone compound is present.

The silicone polymer and the β-alanine derivative surfactant can be present together in a separate layer which includes a water-permeable colloid, or they can be present in the silver halide emulsion itself. When the silicone lubricant and the β-alanine derivative surfactant are applied as a separate layer, the layer may be coated over the silver halide emulsion or the layer may be present on the photographic film as a backing layer.

The surfactant used in this invention is an amphoteric β-alanine derivative having the formula:

or

In these formulas, R represents an aliphatic hydrocarbon radical of from 8 to 20 carbon atoms such as octyl, decyl, dodecyl, hexadecyl, octadecyl, etc.; X represents hydrogen, an alkali metal, e.g., sodium, potassium, lithium, etc., ammonium, or an organic amine cation such as diethanolamine, triethylamine, triethanolamine, morpholine, or piperidine; and $n=0$ or 1. These compounds are prepared by reacting a primary amine having from 8 to 20 carbon atoms with chloropropionic or bromopropionic acid in the presence of an alkali such as sodium hydroxide or potassium carbonate. The use of these surfactants in photographic emulsions is disclosed in U.S. Patent 3,133,816 of Ben-Ezra issued May 19, 1964.

The surfactants can also be prepared in accordance with the method described in U.S. Patent 2,468,012 of Isbell issued Apr. 19, 1949, by condensing at 25–30° C., a primary amine containing from 8 to 20 carbon atoms with methyl acrylate to form the β-alkylaminopropionate. The methyl ester is hydrolyzed to an acid or converted to the alkali or organic amine salts by the conventional method of saponification. The secondary amine is obtained by the use of molar proportions whereas the tertiary amine is obtained by using at least two molar equivalents of the acid derivatives.

In the selection of the amines it is usually more economical to select those with an even number of hydrocarbon atoms because they are commercially available. The mixtures of amines obtained from coconut, soybeans or tallow may be used with equal success. Compounds which have been found to be particularly useful include the following:

Sodium-N-dodecyl-β-aminopropionate

N-decyl-β-aminopropionic acid

Potassium-N-tetradecyl-β-aminopropionate

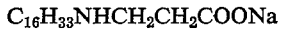

Sodium-N-hexadecyl-β-aminopropionate

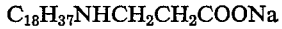

Sodium-N-octadecyl-β-aminopropionate

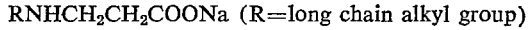

Sodium-N-coco-β-aminopropionate

The concentration of the surfactant can be varied widely. Generally, the surfactant can be used in an amount from about 2 to about 150%, preferably 15–70%, based on the weight of the silicone compound.

Instead of being added to the lubricating composition as a dispersion, the silicone polymer can be added in a suitable organic solvent therefor, e.g., amyl acetate, benzene, carbon tetrachloride, ethyl ether, perchloroethylene, petroleum ether, or xylene. The organic solvent, of course, must not adversely affect the physical or photographic properties of the photographic film.

The lubricating composition of the invention is useful on all types of photographic films such as negatives, master positives, duplicating negatives, release positives, sound recording films, and title stock, and, in addition, cut films and roll films. The invention is most beneficial to motion picture films because such films are subject under normal conditions of use in cameras and projectors to sliding friction.

An advantage of this invention is that photographic films are obtained which have materially reduced sliding friction in cameras, projectors and other apparatus and thus have a lesser tendency to jam in such apparatus. An additional advantage is that the noise or chatter of the films when in use is reduced. A further advantage is that the film surface is less tacky and consequently is less susceptible to dirt and lint pickup. A still further advantage is that the film possesses increased abrasion resistance. Additional advantages of the film include a reduction in surface static buildup and improved rewind properties as a result of the improved slip characteristics of the film surface.

The silver halide emulsion of a photographic element useful in this invention can contain conventional addenda such as gelatin plasticizers, coating aids, antifogants such as the azaindines and hardeners such as aldehyde hardeners, e.g., formaldehyde, mucochloric acid, glutaraldehyde bis(sodium bisulfite), maleic dialdehyde, aziridines, dioxane derivatives and oxypolysaccharides. Sensitizing dyes useful in sensitizing such emulsions are described, for example, in U.S. Patents 2,526,632 of Brooker and White issued Oct. 24, 1950, and 2,503,776 of Sprague issued Apr. 11, 1950. Spectral sensitizers which can be used are the cyanines, merocyanines, complex (trinuclear) cyanines, complex (trinuclear) merocyanines, styryls, and hemicyanines. Developing agents can also be incorporated into the silver halide emulsion if desired or can be contained in a separate underlayer. Various silver salts can be used as the sensitive salt such as silver bromide, silver iodide, silver chloride, or mixed silver halides such as silver chlorobromide or silver bromoiodide.

The silver halide emulsion layer of a photographic element which is useful in the instant invention can contain any of the hydrophilic, water-permeable binding materials suitable for this purpose. Suitable materials include gelatin, colloidal albumin, polyvinyl compounds, cellulose derivatives, acrylamide polymers, etc. Mixtures of these binding agents can also be used. The binding agents for the emulsion layer of the photographic element can also contain dispersed polymerized vinyl compounds. Such compounds are disclosed, for example, in U.S. Patents 3,142,568 of Nottorf issued July 28, 1964; 3,193,386 of White issued July 6, 1965; 3,062,674 of Houck, Smith and Yudelson issued Nov. 6, 1962; and 3,220,844 of Houck, Smith and Yudelson issued Nov. 30, 1965; and include the water-insoluble polymers of alkyl acrylates and methacrylates, acrylic acid, sulfoalkyl acrylates or methacrylates and the like.

The silver halide emulsion of a photographic element which is useful in the instant invention can be coated on a wide variety of supports. Typical supports are cellulose nitrate film, cellulose ester film, polyvinyl acetal film, polystytyrene film, poly(ethylene terephthalate) film and related films or resinous materials as well as glass, paper, metal and the like. Supports such as paper which are coated with α-olefin polymers, particularly polymers of α-olefins containing two or more carbon atoms, as exemplified by polyethylene, polypropylene, ethylene-butene copolymers and the like can also be employed.

The speed of the photographic emulsions useful in the instant invention can be further increased by including in the emulsions a variety of hydrophilic colloids such as carboxymethyl protein of the type described in U.S. Patent 3,011,890 of Gates, Miller and Koller issued Dec. 5, 1961, and polysaccharides of the type described in Canadian Patent 635,206 of Koller and Russel issued Jan. 23, 1962.

Photographic emulsions useful in the instant invention can also contain speed-increasing compounds such as quaternary ammonium compounds, polyethylene glycols or thioethers. Frequently, useful effects can be obtained by adding the aforementioned speed-increasing compounds to the photographic developer solutions instead of, or in addition to, the photographic emulsions.

The photographic elements prepared according to the instant invention can be used in various kinds of photographic systems. In addition to being useful in X-ray and other non-optically sensitized systems, they can also be used in orthochromatic, panchromatic and infrared sensitive systems. The sensitizing addenda can be added to photographic systems before or after any sensitizing dyes which are used.

The invention can be used in emulsions intended for color photography, for example, emulsions containing color-forming couplers or emulsions to be developed by solutions containing couplers or other color-generating materials, emulsions of the mixed-packet type such as described in U.S. Patent 2,698,794 of Godowsky issued Jan. 4, 1955; in silver dye-bleach systems; and emulsions of the mixed-grain type such as described in U.S. Patent 2,592,243 of Carroll and Hanson issued Apr. 8, 1952.

Silver hadile emulsions useful in the instant invention can be sensitized using any of the well-known techniques in emulsion making, for example, by digesting with naturally active gelatin or various sulfur, selenium, tellurium compounds and/or gold compounds. The emulsions can also be sensitized with salts of noble metals of Group VIII of the Periodic Table which have an atomic weight greater than 100.

The following example will illustrate the invention but is not to be construed to limit it in any way.

EXAMPLE

An incorporated-coupler multilayer color film of the type described in U.S. Patent 3,046,129 of Graham and Sagel issued July 24, 1962, is prepared. Over the emulsion layers in this multilayer color film is coated a layer comprising gelatin at a laydown of 42 milligrams per square foot and sodium-N-coco-β-aminopropionate (Deriphat 151 surfactant manufactured by General Mills, Inc.) at a laydown of 2.8 milligrams per square foot. Another sample is prepared in the same manner wherein a silicone lubricant (Dow Corning DC–36 emulsion) is added to the top layer at a laydown of 6.8 milligrams per square foot. Still other samples are prepared in the same manner containing a silicone lubricant and wherein various other surfactants are substituted for the Deriphat 151 surfactant. Another sample is prepared in the same manner wherein Spermafol 52 lubricant (a partialy hydrogenated sperm oil commercially available from the Archer-Daniels-Midlands Company) is employed at a laydown of 5.5 milligrams per square foot and saponi is employed as the surfactant at a laydown of 7.2 miligrams per square foot. A sample is attempted to be prepared with gelatin and DC–36 emulsion in the coating without surfactant but could not be coated on the color film because of repellency. The dried coatings are slit into 16-mm. widths and then tested for surface friction.

The test for surface friction consists of measuring, by an instrument which records on chart paper, the instantaneous amount of force required to pull each 16-mm. film sample through a film gate. Several feet of a film sample which has a smooth surface can be pulled through the gate with only a variation of about 0.2 ounce of force being recorded on the chart paper. Where the film has a rough spot, the recording instrument records on the chart paper a "friction peak." When a "friction peak" occurs, the frictional force required to pull the rough spot on the film sample through the film gate increases from 1 to 2 ounces. These "friction peaks" represent a potential jamming spot on a film when it is used in a projector, camera or film magazine. An optimum film would, of course, have no "friction peaks."

The following results are obtained when the above samples are tested:

| Lubricant (mg./ft.²) | Surfactant (mg./ft.²) | Number of friction peaks | Length of sample tested (ft.) | Friction peaks per foot of sample |
|---|---|---|---|---|
| None | Deriphat 151 Surfactant (2.8) | 39 | 14 | 2.8 |
| DC–36 emulsion (6.8). | None | | | |
| Do | Deriphat 151 Surfactant (2.8). | 2 | 11 | 0.18 |
| Do | Saponin (7.2) | 47 | 13 | 4.6 |
| Do | n-Myristal-N-methyl taurine (2.8). | 6 | 15 | 0.40 |
| Do | Octyl phenoxy polyethoxy ethanol (2.8). | 9 | 11.5 | 0.78 |
| Spermafol 52 Lubricant (5.5). | Saponin (7.2) | 47 | 10 | 4.7 |

The above results indicate that the particular lubricant-surfactant combination of the instant invention provides a film with the smallest number of "friction peaks." Other well-known surfactants which have been suggested for use with the same lubricant provide a film with a significantly greater number of "friction peaks." Another well-known lubricant in combination with saponin also provides a film with a significantly greater number of "friction peaks."

Although the invention has been described in considerable detail with particular reference to certain preferred embodiments thereof, variations and modifications can be effected within the spirit and scope of the invention as described hereinbefore and as defined in the appended claims.

I claim:

1. A photographic element comprising a support coated with a silver halide emulsion, said element containing a lubricating amount of a polymeric silicone lubricant and a surfactant having the formula:

or

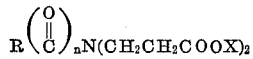

wherein R is an aliphatic hydrocarbon radical having from 8 to 20 carbon atoms; X is hydrogen, an alkali metal, ammonium or an organic amine cation; and $n=0$ or 1.

2. The photographic element of claim 1 wherein said polymeric silicone lubricant and said surfactant are present in a layer coated over said silver halide emulsion.

3. The photographic element of claim 1 wherein said polymeric silicone lubricant and said surfactant are present in a backing layer.

4. The photographic element of claim 1 wherein said polymeric silicone lubricant and said surfactant are present in said silver halide emulsion.

5. The photographic element of claim 2 wherein said polymeric silicone lubricant is present in a concentration of from about 0.5 to about 10% by weight based on the total solids content of said layer and said surfactant is present in a concentration of from about 2 to about 150% based on the weight of said polymeric silicone lubricant.

6. The photographic element of claim 3 wherein said polymeric silicone lubricant is present in a concentration of from about 0.5 to about 10% by weight based on the total solids content of said layer and said surfactant is present in a concentration of from about 2 to about 150% based on the weight of said polymeric silicone lubricant.

7. The photographic element of claim 4 wherein said polymeric silicone lubricant is present in a concentration of from about 0.5 to about 10% by weight based on the total solids content of said silver halide emulsion layer and said surfactant is present in a concentration of from about 2 to about 150% based on the weight of said polymeric silicone lubricant.

8. The photographic element of claim 2 wherein said surfactant is sodium-N-coco-β-aminopropionate and said polymeric silicone lubricant has the formula:

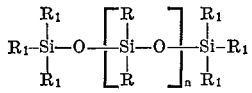

wherein R is an alkyl radical of 1 to 3 carbon atoms and $R_1$ is an alkyl radical of 1 to 3 carbon atoms or an alkoxy radical of 1 to 2 carbon atoms and $n$ is any number from 0 to 2000.

9. The photographic element of claim 5 wherein said surfactant is sodium-N-coco-β-aminopropionate and said polymeric silicone lubricant has the formula:

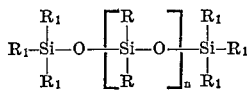

wherein R is an alkyl radical of 1 to 3 carbon atoms and $R_1$ is an alkyl radical of 1 to 3 carbon atoms or an alkoxy radical of 1 to 2 carbon atoms and $n$ is any number from 0 to 2000.

10. A composition comprising:
  (a) a water-permeable colloid,
  (b) a polymeric silicone lubricant, and
  (c) a surfactant having the formula:

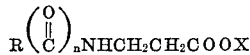

or

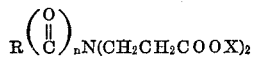

wherein R is an aliphatic hydrocarbon radical having from 8 to 20 carbon atoms; X is hydrogen, an alkali metal, ammonium or an organic amine cation; and $n=0$ or 1.

11. The composition of claim 10 wherein said polymeric silicone lubricant is present in a concentration of from about 0.5 to about 10% by weight based on the total solids content of said composition and said surfactant is present in a concentration of from about 2 to about 150% based on the weight of said polymeric silicone lubricant.

12. The composition of claim 10 wherein said surfactant is sodium-N-coco-β-aminopropionate and said polymeric silicone lubricant has the formula:

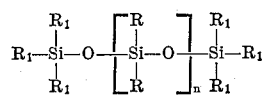

wherein R is an alkyl radical of 1 to 3 carbon atoms and $R_1$ is an alkyl radical of 1 to 3 carbon atoms or an alkoxy radical of 1 to 2 carbon atoms and $n$ is any number from 0 to 2000.

13. The composition of claim 11 wherein said surfactant is sodium-N-coco-β-aminopropionate and said polymeric silicone lubricant has the formula:

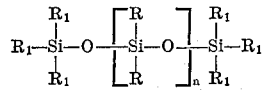

wherein R is an alkyl radical of 1 to 3 carbon atoms and $R_1$ is an alkyl radical of 1 to 3 carbon atoms or an alkoxy radical of 1 to 2 carbon atoms and $n$ is any number from 0 to 2000.

References Cited

UNITED STATES PATENTS 3,042,522  7/1962  Ben-Ezra _____ 96—87

FOREIGN PATENTS 874,081  8/1961  Great Britain.
955,061  4/1964  Great Britain.

NORMAN G. TORCHIN, Primary Examiner

RONALD H. SMITH, Assistant Examiner

U.S. Cl. X.R.

96—67, 84, 87, 114; 106—125; 252—9